United States Patent [19]

Abe

[11] Patent Number: 5,126,856
[45] Date of Patent: Jun. 30, 1992

[54] COLOR PROCESSOR WITH DIAGNOSIS OF FAULT CONDITION BY COMPARING DENSITY LEVELS

[75] Inventor: Yoshinori Abe, Tama, Japan

[73] Assignee: Konica Corporation, Tokyo, Japan

[21] Appl. No.: 636,542

[22] Filed: Dec. 31, 1990

Related U.S. Application Data

[63] Continuation of Ser. No. 385,459, Jul. 26, 1989, abandoned.

[30] Foreign Application Priority Data

| Aug. 1, 1988 | [JP] | Japan | 63-192403 |
| Aug. 1, 1988 | [JP] | Japan | 63-192404 |
| Aug. 1, 1988 | [JP] | Japan | 63-192405 |

[51] Int. Cl.⁵ .............. H04N 1/028; H04N 17/00
[52] U.S. Cl. ........................ 358/406; 355/206
[58] Field of Search .......... 358/406, 405, 75, 10; 355/206

[56] References Cited

U.S. PATENT DOCUMENTS

| 4,627,712 | 12/1986 | Usami | 355/206 |
| 4,633,326 | 12/1986 | Endoh et al. | 358/406 |
| 4,674,863 | 6/1987 | Tomosada et al. | 355/206 |
| 4,724,489 | 2/1988 | Oldershaw | 358/406 |
| 4,751,377 | 6/1988 | Ishizaka et al. | 358/406 X |
| 4,774,575 | 9/1988 | Takayama | 358/10 X |
| 4,779,106 | 10/1988 | Mills | 358/406 X |
| 4,802,229 | 1/1989 | Yamada | 358/406 X |
| 4,841,361 | 6/1989 | Matsunawa et al. | 358/75 X |
| 4,893,180 | 1/1990 | Shigaki et al. | 358/75 X |

FOREIGN PATENT DOCUMENTS

| 57-203371 | 12/1982 | Japan | 358/406 |
| 1-80195 | 3/1989 | Japan | |

Primary Examiner—James J. Groody
Assistant Examiner—Mark R. Powell
Attorney, Agent, or Firm—Finnegan, Henderson, Farabow, Garrett and Dunner

[57] ABSTRACT

A color image processor for scanning a color image, includes an irradiation light for irradiating the color image with a light, a color separator for separating the reflected light from the irradiated color image into plural element color lights, plural bar-shaped photoelectric transformer for transforming each of the element color lights into an electrical image signal, a converter for converting the electrical image signal to a digital image signal, a memory in which the digital image signal is stored, and a determiner for determining whether a scanner, such as the irradiation light and the photoelectric transformer is functioning properly according to a density level recognized from the digital image signal.

10 Claims, 10 Drawing Sheets

BLUE MARKER

AREA SIGNAL Q'B (Q'R)

FIG. 7

RxD SIGNAL FORMAT

| | 7 | 6 | 5 | 4 | 3 | 2 | 1 | 0 (BIT) |
|---|---|---|---|---|---|---|---|---|
| 1ST BYTE | 0 | | | | | CHKIP2 | CHKIP1 | CHKIP0 |
| 2ND BYTE | 1 | SC2 | SC1 | SC0 | CHKPRE | | CHANG | EE |
| 3RD BYTE | 1 | 0 | 0 | | RD3 | RD2 | RD1 | RD0 |
| 4TH BYTE | 1 | 0 | 1 | | BL3 | BL2 | BL1 | BL0 |
| 5TH BYTE | 1 | 1 | 0 | | BK3 | BK2 | BK1 | BK0 |
| 6TH BYTE | 1 | 0 | 0 | | HZ3 | HZ2 | HZ1 | HZ0 |
| 7TH BYTE | 1 | 0 | 1 | HZ8 | HZ7 | HZ6 | HZ5 | HZ4 |

FIG. 8

TxD SIGNAL FORMAT

| | 7 | 6 | 5 | 4 | 3 | 2 | 1 | 0 (BIT) |
|---|---|---|---|---|---|---|---|---|
| 1ST BYTE | 1 | P7A | P6A | P5A | P4A | P3A | P2A | P1A |
| 2ND BYTE | 1 | P7B | P6B | P5B | P4B | P3B | P2B | P1B |

| CHKIP2 | CHKIP1 | CHKIP0 | MODE |
|---|---|---|---|
| 0 | 0 | 0 | I (NORMAL READING) |
| 0 | 0 | 1 | III (CCD LEVEL CSP) |
| 0 | 1 | 0 | III (CCD LEVEL CSP+1) |
| 0 | 1 | 1 | II (LIGHT-DISTRIBUTION ADJUSTMENT CYAN) |
| 1 | 0 | 0 | II (LIGHT-DISTRIBUTION ADJUSTMENT RED) |

400:
PROCESSING OF IMAGE
PROCESSING UNIT

420:
PROCESSING OF SCANNER
(MAIN BODY)

FIG. 13
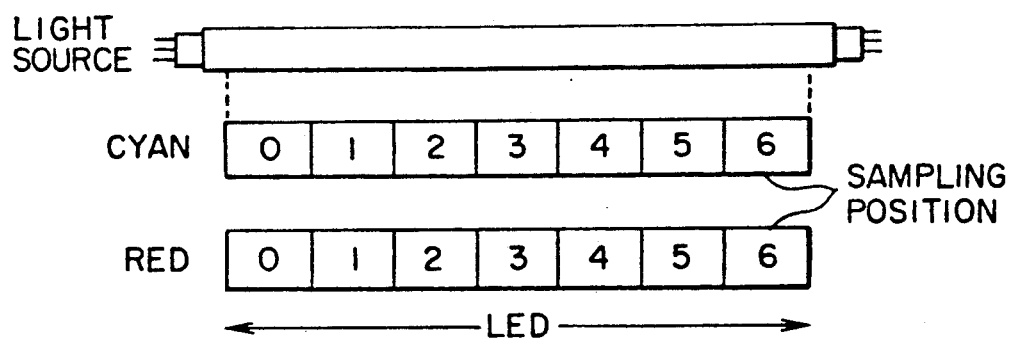
FIG. 14
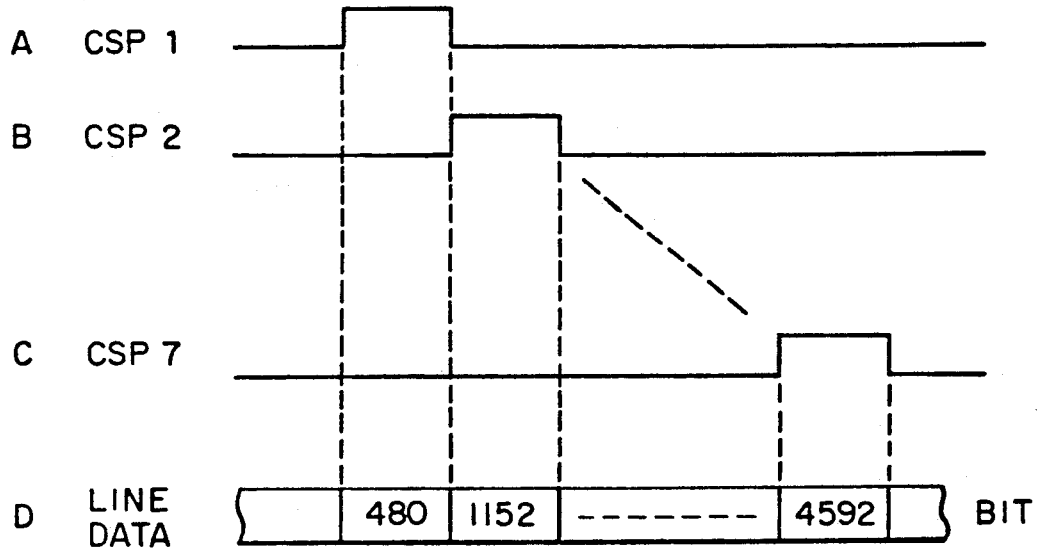
FIG. 15
| PxA | PxB | JUDGMENT CONDITION | JUDGMENT RESULTS |
|---|---|---|---|
| 0 | 0 | $31 \geq x \geq 0$ | LOW LEVEL |
| 1 | 0 | $62 \geq x > 31$ | NORMAL |
| 0 | 1 | $x = 63$ | OVERFLOW |

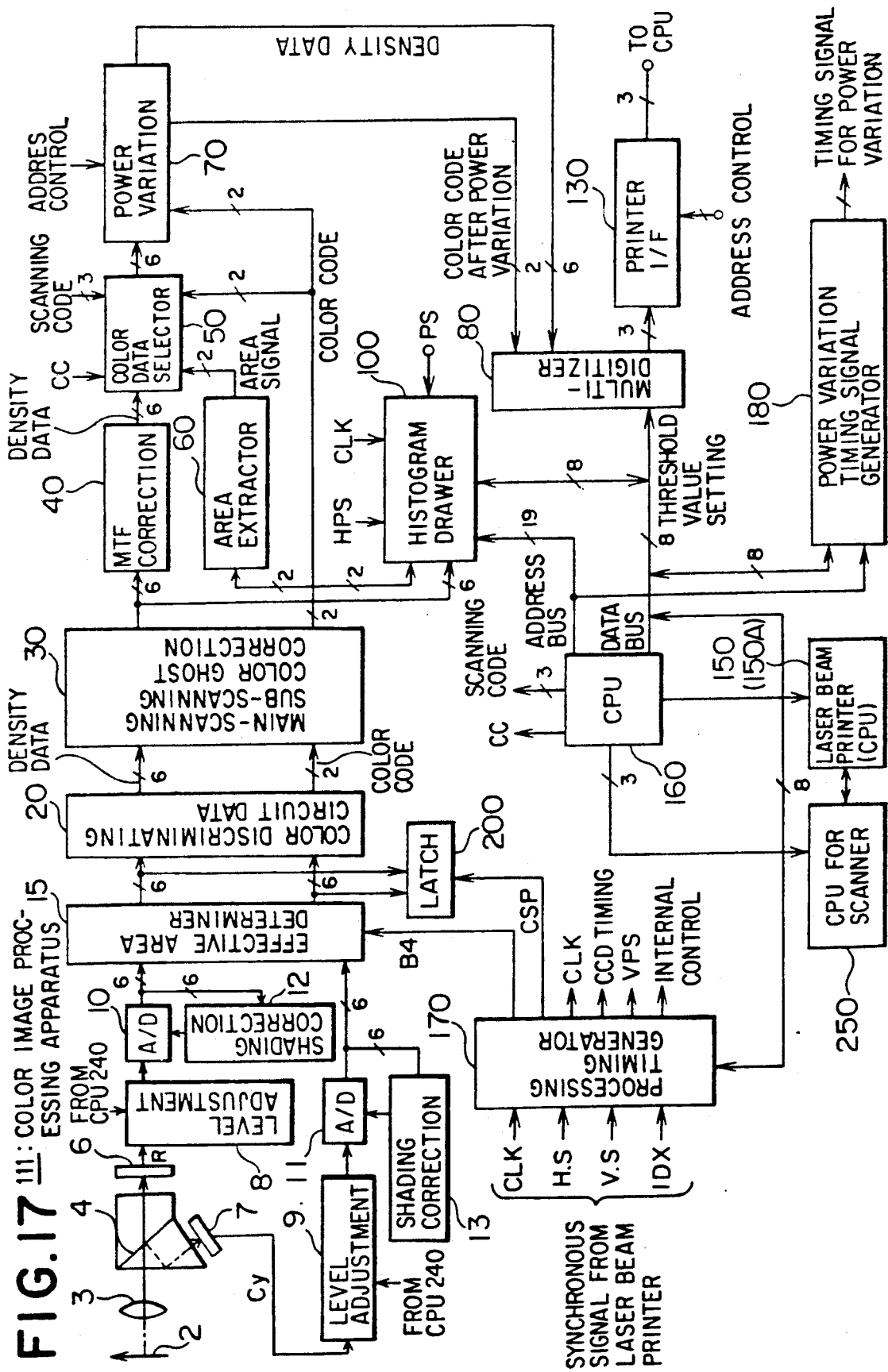

COLOR PROCESSOR WITH DIAGNOSIS OF FAULT CONDITION BY COMPARING DENSITY LEVELS

This application is a continuation of application Ser. No. 07/385,459, filed Jul. 26, 1989 now abandoned.

BACKGROUND OF THE INVENTION

The present invention relates to a color image processing apparatus which may favorably be applied to an image processing apparatus of a plain paper color copier. Particularly the invention is concerned with and, intended for a color image processing apparatus capable of easily ascertaining the condition of an image reading means and the state of the light source and light distribution state, and furthermore capable of eliminating an over-flow in A/D (analog-to-digital) conversion.

In a color image processing apparatus such as a color copier in which a laser beam generator is used, color image information is obtained by separating plural colors on a color document, and color images are recorded according to the color image information.

When color images are recorded, the apparatus can conduct variable magnification processing, partial color conversion processing, and other kinds of image processing by the built-in CPU (Central Processing Unit).

Partial color conversion processing is defined as image compiling processing by which the image information inside or outside the designated area is recorded with the color used to designate the area.

In this type of color copier, it is ascertained by the built-in CPU whether the condition of the components of the copier is adequate or not, and according to the result, the copying operation is stopped or abnormal condition signals are displayed.

In this case, the condition of the components is estimated by the image signals which are read out by an image reading means such as a CCD (Charge-Coupled device) in copying.

In the case of judging by the built-in CPU the condition of components which constitute a copier, particularly the state of a CCD, which is an image reading means, or judging disconnection of the light source for document exposure, for example a tungsten halogen lamp, the CPU can not pass a correct judgment. It is a disadvantage of estimating the condition of the components of a copier.

When the light source circuit is cut off, the image signal level becomes zero. Therefore, it can be surely detected according to the image signal whether the light source is disconnected or not.

However, it is difficult to judge the condition of the CCD, the image reading means. The reason is that the condition of the CCD is judged by a prescribed standard level, but the image signals which form the basis of judgment, differ according to the contents of documents.

These image signals are different from the electrical signals to which the optical images exposed on a document are converted. The signals can be image signals which are boosted by AGC (Automatic Gain Control) or signals to which various kinds of image processing are conducted.

An object of the present invention is to provide a color image processing apparatus which can positively and easily judge the condition of the copier components.

In this type of color copier, a tubular lamp such as a tungsten halogen lamp or a fluorescent lamp which is on the market, is used as the light source to read images.

In a case where a tubular lamp is used, the state of light distribution must be checked. The reason is that images on a document can not be correctly converted to color signals when light distribution is bad.

When copiers were shipped from a factory, the state of light distribution was conventionally checked with a synchroscope. Light distribution had been investigated focusing on one point of the light source. For instance, the investigation has been conducted on the basis of the converted data at the center of the light source.

But it is very difficult in practice to take a synchroscope to the place where a customer is using the apparatus and to inspect light distribution of the light source.

Therefore, when a lens or a CCD. which is an optical reading means, is replaced during maintenance and inspection at the customer's place, it is not easy to confirm the results of light distribution adjustment.

Only light distribution of the light source center is inspected, so light distribution of the total area can not be confirmed.

Accordingly, it is an object of the present invention to provide a color image processing apparatus which can easily check light distribution of the total area.

In this type of image processing, an image signal transferred photoelectrically is converted to a digital signal and various kinds of signal processing are conducted in the form of a digital signal.

Therefore, usually an analog image signal transferred photoelectrically by an image reading means, is amplified to an appropriate level by an amplifier and fed to A/D converter for sampling and quantization. that A/D conversion output in a line, for instance at the center, can become the maximum value.

Level adjustment, a process conducted prior to A/D conversion, is conducted by controlling an amplifier so that A/D conversion in a line, for instance at the center, can become the maximum value.

This is based on a general rule that when a straight light source is used in photoelectric conversion, light distribution of the center is more intense than that of the peripheral portion. Therefore, in the case where a straight light source, light of which is the most intense at the center, is used, there is no problem.

However, some light sources show light distribution patterns in which light from the peripheral portion is more intense than that of the center.

Up to this time, it had been thought that light was always the most intense at the center of the light source. Therefore, the level of photoelectric conversion signal was adjusted according to the photoelectric signal obtained at the center of a line. For that reason, in the above-mentioned case. A/D conversion output overflowed and the photoelectric signal could not be correctly A/D converted.

Another object of this invention is to provide a color image processing apparatus which can correctly conduct A/D conversion processing even when a light source with a biased light distribution is used, and in which A/D conversion output does not overflow.

SUMMARY OF THE INVENTION

In order to solve the problems explained before, the first example of the present invention comprises a means by which color image information is separated into a plurality of color separation images and converted to a plurality of color signals; a means by which digital color signals are obtained from those plural color signals; and a memory means to store the digital color signals.

The various features of novelty which characterize the invention are pointed out above. Other related features of the invention will be explained as follows. The apparatus of the invention can detect whether the condition of an image reading means is good or not according to the level of a plurality of digital color signals mentioned above.

In the first example, it is judged by the level of the digital color signals inputted to the memory means whether the condition of components is adequate or not.

A digital color signal is defined as a signal which is obtained by reading out the light reflected from a standard white board, wherein the light is emitted from the light source, with a photoelectric converting means such as a CCD.

In order to solve the problems, the second example of the invention comprises: a means for separating color image information into a plurality of color separation images and converting them into a plurality of color signals; a means for obtaining digital color signals from the plurality of color signals; and a memory means for storing the digital signals.

The judgment of the level is conducted according to the digital color signal and the sampling position in a line of the digital color signal which is used in the judgment, is adjustable. That is one of the features of the second example.

In the second example, light distribution of the light source is detected according to the level of a plurality of digital color signals fed to the above-mentioned memory means, and the results are displayed. When light distribution is detected, sampling of digital color signals obtained from a line is uniformly conducted to detect the whole light distribution of the light source.

By this method, detection devices such as a synchroscope are not necessary in this example and the state of light distribution can be detected over almost all of the light source area.

In order to solve the problems, in the third example of the invention, the apparatus comprises; a photoelectric converting means to convert image information into electric signals; and a means to obtain digital color signals from the photoelectrically converted signals.

In this example, level adjustment of photoelectrically converted signals is conducted according to color signals obtained from a line's maximum light density position.

In the third example, the maximum density position of the light source in the direction of horizontal scanning is detected. Light distribution of the light source is judged by this.

The color signal level is adjusted so that the color signal level obtained from the maximum density position of the light source can become the standard level.

A/D conversion processing is always conducted with the highest efficiency by this method.

Because the density level of color signals obtained from the highest density position of the light source is adjusted to become the standard level, A/D conversion output does not overflow.

BRIEF DESCRIPTION OF THE DRAWINGS

FIG. 7 is a schematic illustration of received data. FIG. 8 is a schematic illustration of transmitted data. FIG. 13 is an example of a light distribution display. FIG. 14 is a diagram which shows the relation of center pulse and sampling pixels. FIG. 15 is a diagram which shows the relation between the judgment results of light distribution and transmitting data. FIG. 17 is a schematic diagram of another example of a color image processing apparatus.

DETAILED DESCRIPTION OF THE PREFERRED EMBODIMENTS

Referring now to the first example of a color image processing apparatus of the invention shown in FIG. 1 and other drawings, the details will be explained as follows.

Figure 1:
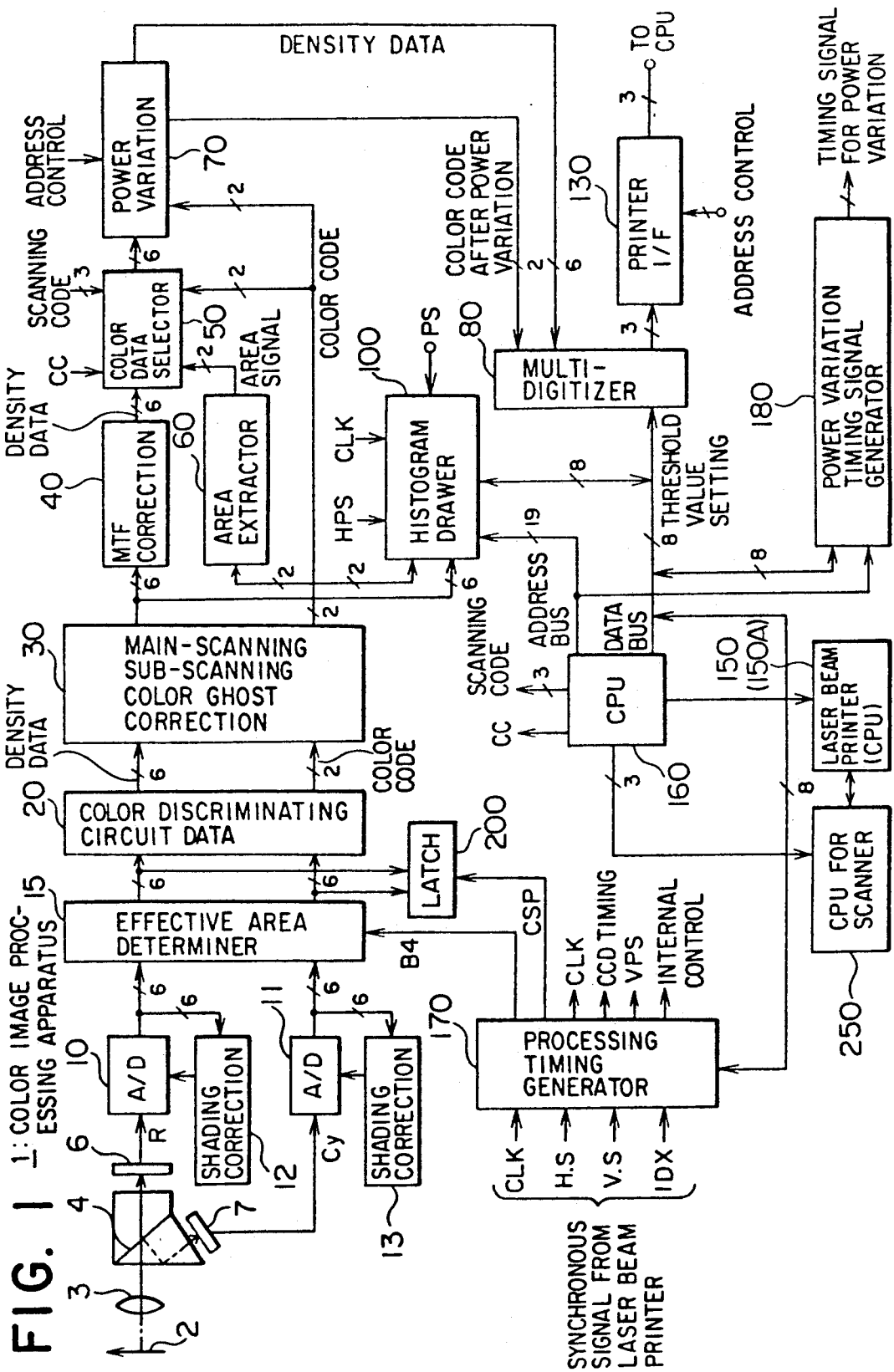
FIG. 1 is a schematic illustration of an example of a color image processing apparatus of the invention. FIG. Z is a diagram of color-discriminating map.
Figure 2:
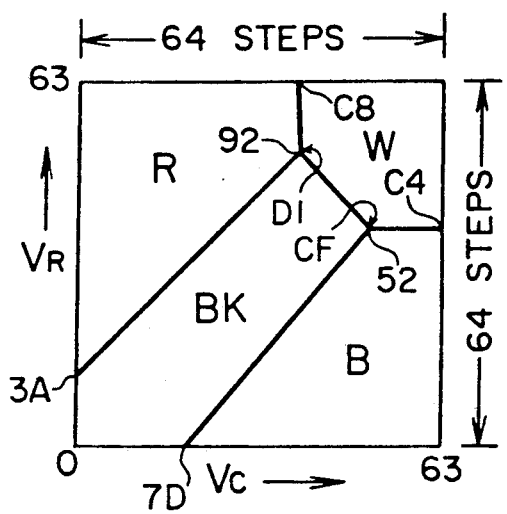

FIG. 1 is a schematic diagram which shows the outlines of a color image processing apparatus of the invention. Image signal processing will be explained as follows.

Color image information (an optical image) of a photographic object 2 such as a document, is separated into two color separation images at the dichroic mirror 4 through the optical system 3. In this example, a color image is separated into a color separation image of red R and that of cyan Cy. For that reason, the dichroic mirror 4 having a cutoff wave length between 540mm and 600mm is used.

The color separation images of red R and cyan Cy are projected to image reading means such as CCD 6 and 7. The image signals of a red component R and a cyan component Cy are output from the respective image reading means.

The image signals R and Cy are sent to A/D converters 10 and 11, and converted to digital signals with the prescribed bit number, in this case 6 bit digital signals. Shading correction is conducted at the same time as A/D conversion. The numerals 12 and 13 represent shading correction circuits.

After shading correction is conducted, digital image signals are extracted. The amount of extraction is the signal portion of the width of the maximum document size and the extracted signal portion is sent to the next step of the color-discriminating circuit 20. When the maximum width of the document is B4 size, the size signal B4 which is generated at the timing signal generating means 170, is used as the gate signal.

The digital image signals which have undergone shading correction, are defined as VR and VC. These image signals VR and VC are sent to the color-discriminating circuit 20 and separated into a plurality of color signals.

This example shows the case where the image signals are separated into three color signals red, blue, and black.

In this case, no matter what color the document may be, the color signal is made to belong to one of red, blue, and black at each pixel. After this processing is conducted, every portion of the document is recognized as being a portion of one of red, blue, and black.

This color-discriminating processing can use colors other than red, blue, and black, and more than three colors can be used.

After the color-discriminating processing, each color signal is constituted by the color code data (2 bit data) which represents each color information and its density information (6 bit data).

The data stored in the color-discriminating conversion table (map) of ROM constitution for example, is used as each color signal data.

FIG. Z is an example of the color-discriminating conversion table.

It is possible to prepare various color-discriminating conversion tables and select one of them according to the kind of document. In this case, table selection is conducted according to instructions from the microcomputer 160 to process images. The microcomputer 160 will be explained later.

The color-discriminated image data is sent to the color image processing process.

First of all, the image data is sent to the color ghost correction means 30 of the next step and the color ghosts of the primary scanning direction (horizontal scanning direction) and the secondary scanning direction (drum rotating direction) are corrected.

The reason for that is, when colors are discriminated, unnecessary color ghosts appear particularly around a black letter.

Color ghost correction aims at only color code data.

After color ghost correction is conducted, the density data in the image data (color code data and density data), is processed in the resolution MTF correction circuit 40 and its resolution is corrected.

The factors which cause deterioration of resolution are problems in the optical system, the optical driving system, the signal processing system, and the recording system. Among them, the optical system and the optical driving system directly affect resolution.

Figure 4:
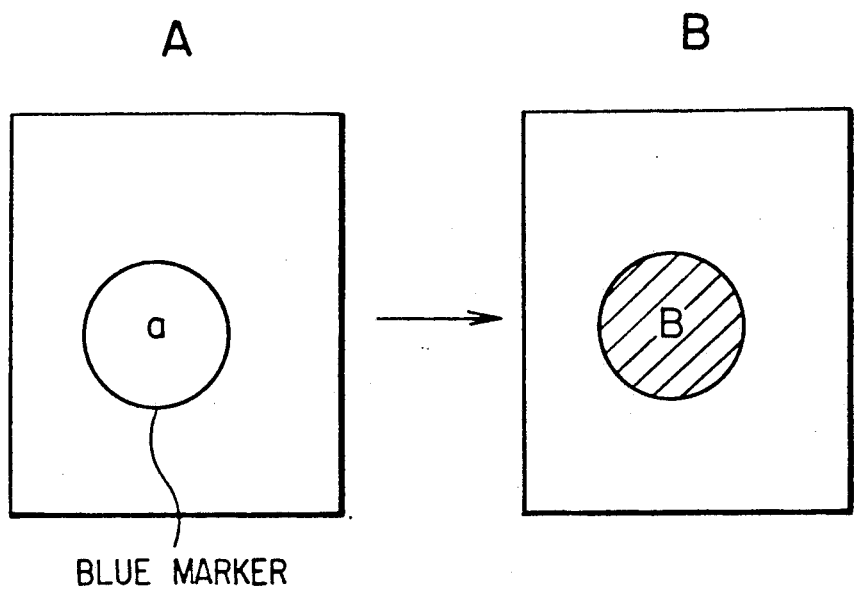
FIG. 4 is a schematic illustration of a change of color markers.

The density data which was corrected in resolution and color code data are individually sent to the color data selector 50, and when the partial color conversion mode is selected, the image area is recorded by a particular color. (Refer to FIG. 4.)

When this partial color conversion mode and other image processing are conducted, it is necessary to detect the marker signals RP and BP from the color marker drawn on the document and extract the area.

Figure 5:
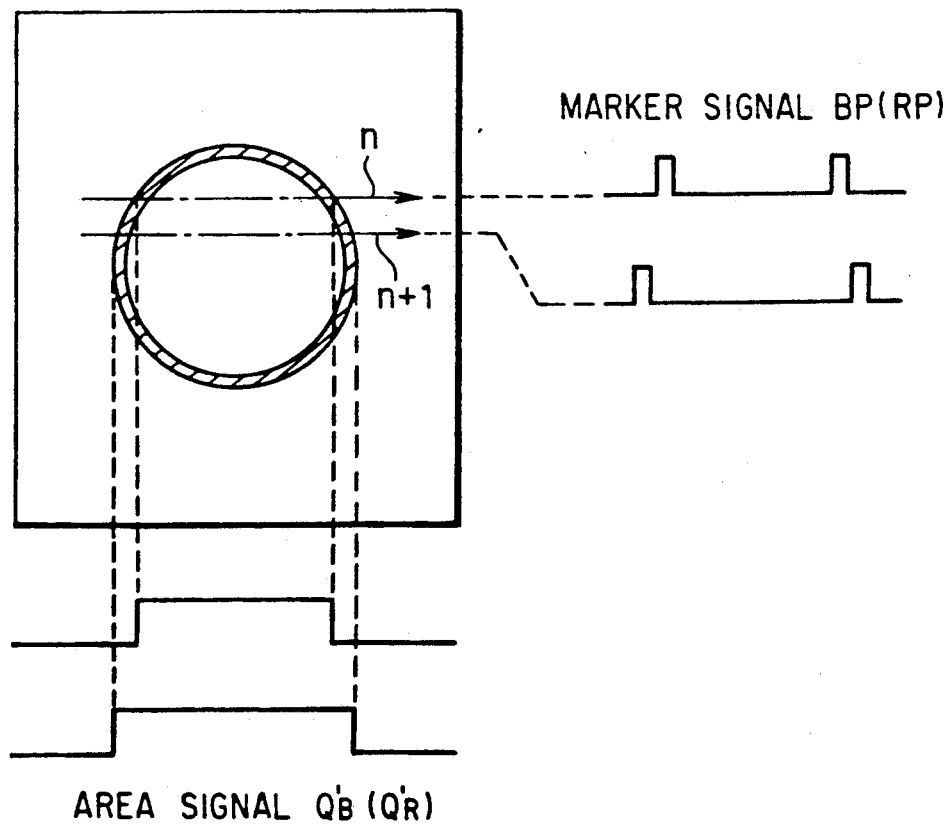
FIG. 5 is a schematic illustration of area extraction.

To attain the object, the area extraction circuit 60 is installed, the color marker, area on a document is detected, and the area information Q'R, and Q'B. (Refer to FIG. 5) obtained from this is supplied to the data selector 50.

In addition to the signals, the scan code signal which indicates the color being copied and the partial color conversion signal CC are supplied to the data selector 50.

The scan code signal will be explained in more detail as follows. In a multicolor copier which can copy a plurality of specific colors, a color image is developed at each rotation of the photoreceptor drum and after all color images are developed, they are transferred and recorded. In this type of copier, the scan code signal indicates the color which is being developed.

Accordingly, when a blue color marker is detected, the apparatus is in the blue copy sequence. The images in a blue color marker can be recorded in blue by outputting the color data corresponding to the signal when the area signal is obtained.

When the apparatus is not in the partial color conversion processing mode, the density data is output only when the color code data coincides with the scan code data. In other words, in the case where the apparatus is in the red copy sequence, while the red color code is being obtained, the density data corresponding to it is output selectively.

The image data (the density data) which is output from the color data selector 50, is magnified or reduced in the variable magnification circuit 70.

Magnification and reduction processing is conducted by interpolating the density data in the direction of the primary scan and by controlling the scanning speed in the direction of the secondary scan (the rotating direction of the photoreceptor drum)

When the scanning speed is increased, the image is processed to be reduced, because the sampling data of the direction of the secondary scan is thinned out. On the contrary, when the scanning speed is slowed down, the image is processed to be magnified.

In this example, color code data is also magnified or reduced at the same time, and then supplied to the multi-digitizer circuit 80.

The density data provided with magnification or reduction processing is multi-digitized by the multi-digitizer 80. For example, by use of four threshold values, the density data composed of 6 bit data is leveled into 5 digital grades from 0 to 4.

The threshold value is set manually or automatically.

In this example, in order to determine the threshold value, the histogram preparing circuit 100 is provided.

Figure 3:
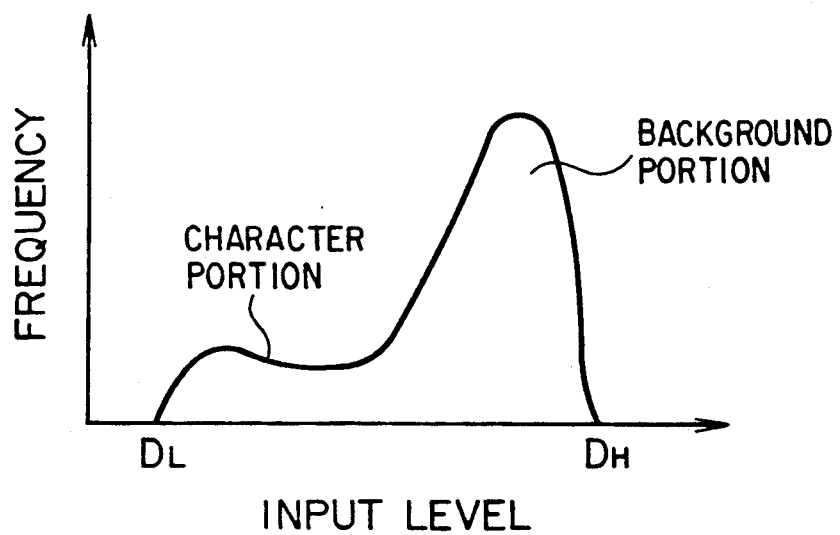
FIG. 3 is a density histogram.

In the histogram preparing circuit 100, a density histogram, as shown in FIG. 3, is drawn with the image data. On the basis of the density histogram, the optimum threshold value for the image is calculated.

A density histogram is drawn for each color so that multi-digitizing processing can be conducted at each color according to the threshold values calculated on the basis of the histogram.

The multi-digitized data composed of 3 bit data is supplied to the host computer 160 through the interface 130.

The multi-digitized signal is supplied through the host computer 160 to the laser beam printer 150 which is part of the output unit. By this multi-digitized signal, the laser is PWM-modulated. The laser beams forms a latent image on the photoreceptor drum mounted on the laser beam printer 150.

The laser beam printer 150 generally performs reverse development.

All instructions and timing of image processing are controlled by the host computer 160.

All process timing is generated by the processing timing signal generator !70, including the signal for the timing of the start of reading of CCD6 and CCD7. The numeral 180 is the timing signal generating circuit to obtain the variable magnification timing.

In example 1, on the basis of the digital color signal inputted to the color-discriminating circuit 20, in other words on the basis of the digital color signal obtained when the standard white board is scanned, the condition of components of the copier is judged if it is adequate or not.

For that reason, the digital color signal obtained from the prescribed area by the latch circuit 200, is latched and this signal is inputted into CPU 160 for processing images.

The digital color signal which is inputted into CPU 160, is furthermore inputted into CPU (scanner CPU) which controls the optical scanning system (scanner). In this way, it is judged whether the density level of the digital color signal is appropriate or not, and whether the condition of components especially of CCD 6 and CCD7 is adequate or not.

Figure 6:
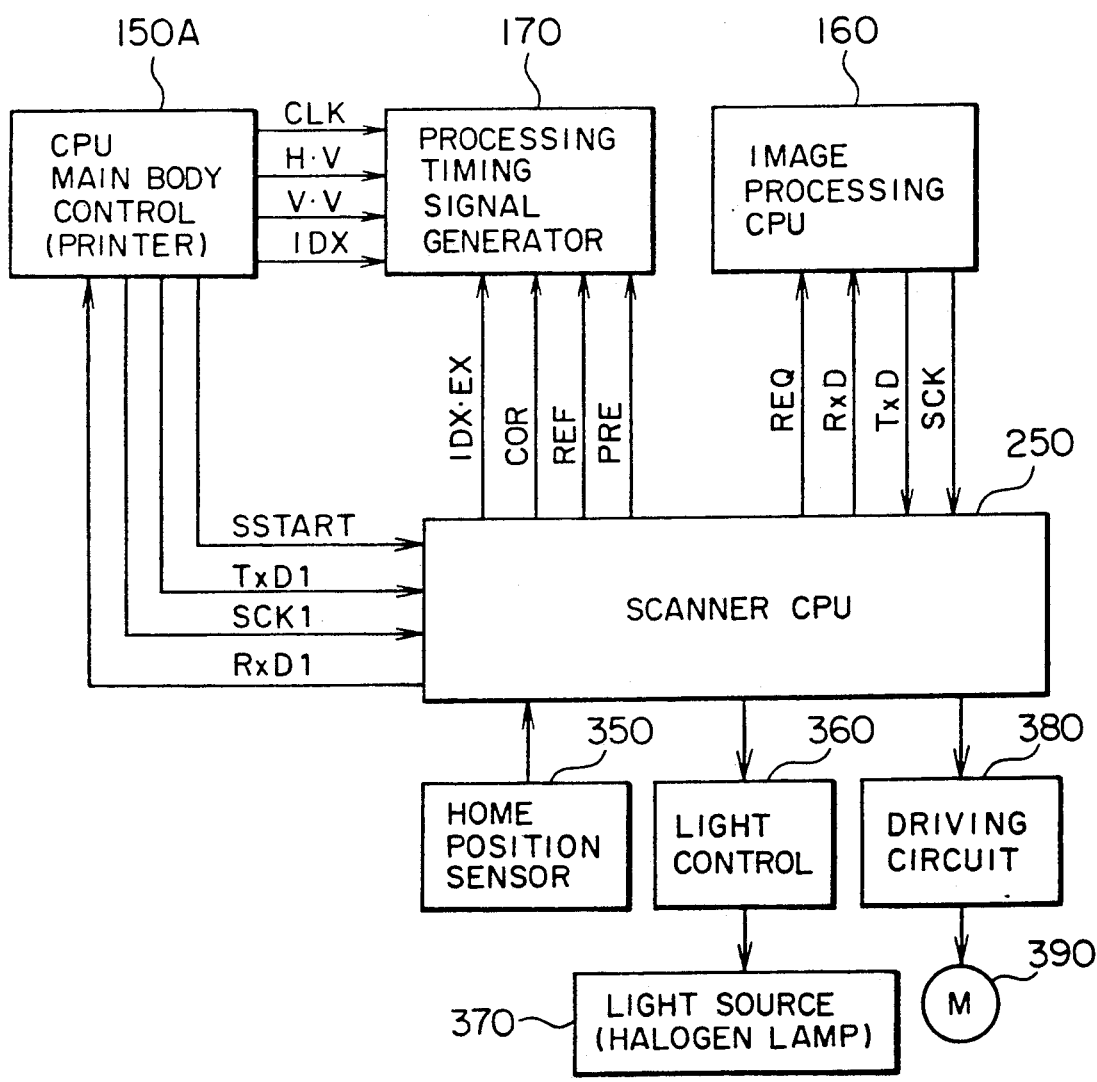
FIG. 6 is a drawing which shows CPU correlation.

FIG. 6 shows an abstract relation of the signal transfer among CPU 160 for processing images, CPU 250 for the scanner, and CPU1 150A for the printer.

The external synchronizing signals such as the horizontal and vertical effective area signals H.V and V.V, the index signal IDX to indicate the start point of each horizontal scanning, and clock signal CLK, are output from the printer CPU 150A to the timing signal generating circuit 170.

The index changing signals IDX and EX are supplied to the process timing generator 170 from the scanner CPU 250. They are the control signals for switching the inner synchronizing signal generated in the process timing generator 170 and the above-mentioned external synchronizing signal.

Other than this, the signal COR which determines the start timing of shading data sampling, the reference signal REF, and pre-scanning signal PRE are supplied. Reference signal REF is a control signal which changes the standard voltage of A/D converter 11 and 12. Pre-scanning signal PRE is a control signal for pre-scanning to draw a histogram prior to document reading.

All of the signals such as the index changing signals IDX and EX, the signal COR which determines the start timing of sampling, the reference signal REF, and the pre-scanning signal PRE are active.

The serial correspondence signals are exchanged between CPU 160 for image processing and CPU 250 for scanning as follows.

Request signal REQ is a signal to control the exchange of serial data between CPU 250 for the scanner and CPU 160 for image processing. They are synchronized with each other by the serial lock SCK.

RxD means serial data (receiving data) transmitted by the scanner. TxD means serial data (transmitting data) transmitted from the image processing side. Actual examples of transmitting and receiving data RxD and TxD are shown in FIG. 7 and FIG. 8.

Figures 9, 10:
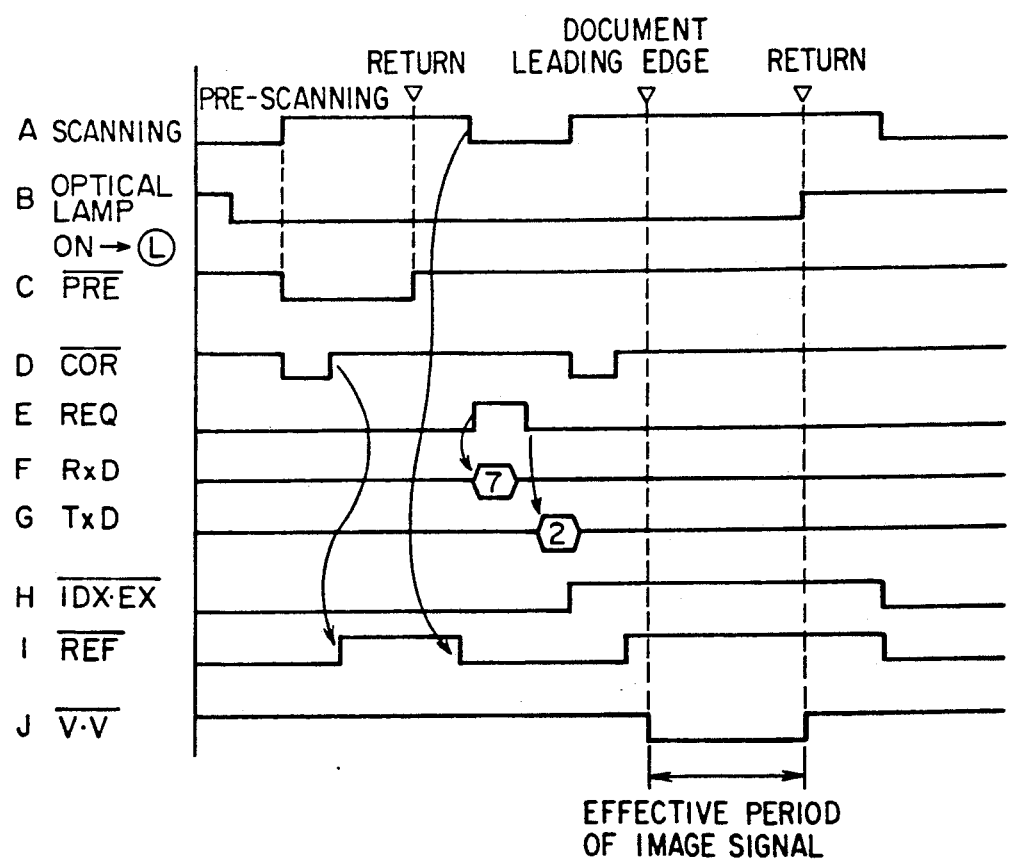
FIG. 9 is a diagram which shows the relation between I/0 check data and the transmitting mode.
FIG. 10 is a waveform diagram to illustrate the transmitting mode.

The receiving data RxD is composed of 7 bytes and the first 3 bits in the first byte is CHKIP for I/O check data. The relation among the check data CHKIP0 to CHKIPZ and the transmitting mode selected by this, is shown in FIG. 9.

In this example, other than Mode I (It is also a normal reading mode.) which transmits digital color signals necessary for the judgment of the quality of parts of the apparatus in the form of TxD, there are Modes II and III. The data transmitted in Mode I is the digital color data of red and cyan.

Mode II is a transmitting mode which is used when the image reading position (data latch position) in a line is changed in order to detect the light distribution status of the light source on almost all of the effective area. Transmitting data are red and cyan digital color signals as in Mode I. The latch pulse used here is the center pulse CSP.

Mode III is used for the adjustment of light distribution as in Mode II. This mode is used to detect the maximum level position of the bar-shaped light source. In this mode too, the center pulse CSP is used to change the image reading position.

The following are codes alloted to each bite of the receiving data RxD.
1. SC0 to SC2...Scanning code
2. CHANG...Partial color conversion code
3. EE...Automatic threshold selecting code
4. CHKPRE...Pre-scanning code
5. RD0 to RD3...Red density level
6. BL0 to BL3...Blue density level
7. BK0 to BK3...Black density level
8. HZ0 to HZ8...Magnification rate for the main scanning direction (50 to 400%)

The following signals are exchanged between CPU 250 for the scanner and CPU 150A for the printer in FIG. 6.

The pulse SSTART which is one of the pulses sent from CPU 150A, indicates that the scanner starts scanning.

Transmitting data TxD1 is obtained when the magnification rate is prescribed. In it, the scanning speed in the secondary scanning direction is designated to the scanner. The pulse signal SSTART and the transmitting data TXD1 are synchronized with each other by the serial lock SCK1.

The image data (receiving data) RxD1 which is actually to be copied, is transmitted from CPU 250.

The sensor output which shows the scanner home position, is input to the scanner CPU 250 from the sensor 350. The light control circuit 560 is controlled by the light signal generated by the scanner CPU 250. By the light control circuit 360, the light source 370, such as a halide lamp and so on, is controlled. The drive circuit 380 is controlled by the motor drive signal, by which the scanner drive motor 390 is controlled.

In this example, the condition of components, especially of CCD and the light source 370 is judged when the optical system of the scanner is in its home position.

The following refers to FIG. 10. First of all, the light source 370 is activated by operating the copy starting button.(Refer to B in FIG. 10.) After the prescribed interval passes, the pre-scanning signal PRE becomes active, and the scanner 250 starts the pre-scanning operation. Before the operation explained above, the information on the standard white board is scanned. (Refer to A and B in FIG. 10)

Then, the sampling start signal COR becomes active. (Refer to D in FIG. 10.) The image data of red and cyan is stored in the memory installed in the shading correction circuit 12 and 13. When pre-scanning is conducted, reference voltage REF is switched to the data stored in the shading correction memory (Refer to I in FIG. 10.)

During pre-scanning, a histogram of the specific area of the image α on the document, is constructed.

When pre-scanning is finished, the receiving data RxD is transmitted to CPU 160 for processing images by the request signal REQ. (Refer to E and F in FIG. 10)

The receiving data RxD is analyzed by CPU 160. When the applied mode is Mode I by which it is judged whether the condition of components of the apparatus such as CCD 6, CCD 7, the light source, and so on, are adequate 0r not, the obtained image data of red and cyan is sent to CPU 250 for scanning being inserted in the transmitting data TxD.

The transmitted data is analyzed in CPU 250 for scanning and the condition of CCD is judged.

When CCD and other parts have been proved to be satisfactory according to the judgment, the first document sheet copying operation starts after the pre-scanning mode is finished. (Refer to FIG. 10.) At this momentum, the index changeover signal IDX.EX is reversed (Refer to H in FIG. 10.), and synchronized with the signals (IDX, H.V, V.V) to scan images on the document and process the data. The image data in the vertical effective area signal V.V, will be processed later. (Refer to J in FIG. 10.)

Shading correction is conducted according to the image data which was scanned due to the reference signal REF. (Refer to I in FIG. 10.)

Figure 11:
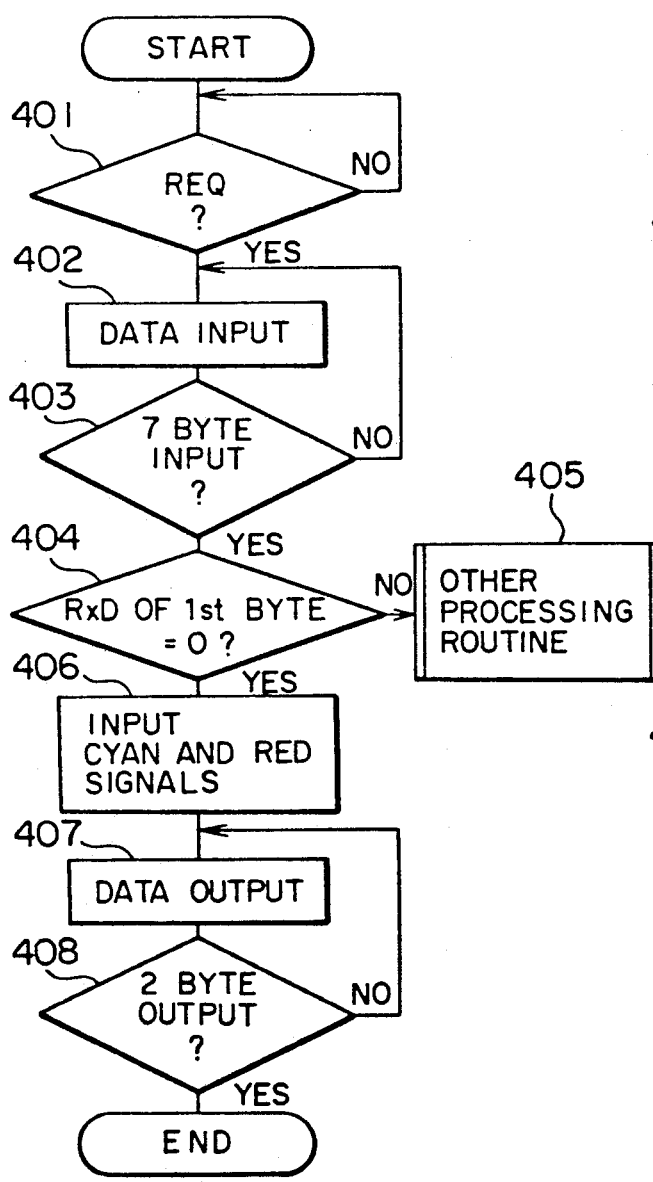
FIG. 11 is a flow chart which shows an example of the processing procedure in the image processing CPU.

FIG. 11 is a flow chart 400 which shows an example of a control program stored in CPU 160 for image processing for evaluating the condition of components.

When it is detected that the request signal REQ has risen, inputting of the receiving data RxD starts. When all of the data input (7 bytes) is completed, the receiving data RxD which was inserted at the first bite, is decoded. (step 401 to 404)

When, as a result of decoding, the mode is found not to be the transmitting mode I, the processing routine changes to another processing routine 405. When it is the transmitting mode I, the red and cyan digital signals which are latched by the center pulse CSP, are input. (step 406)

Timing is adjusted so that the center pulse CSP can be obtained when the center portion of a line is scanned.

The input data is transmitted to the scanner CPU 250 as transmitting data TxD. When the transmitting data becomes 2 bytes, the transmitting mode is finished and the data passes through this processing routine. (step 407, 408)

Figure 12:
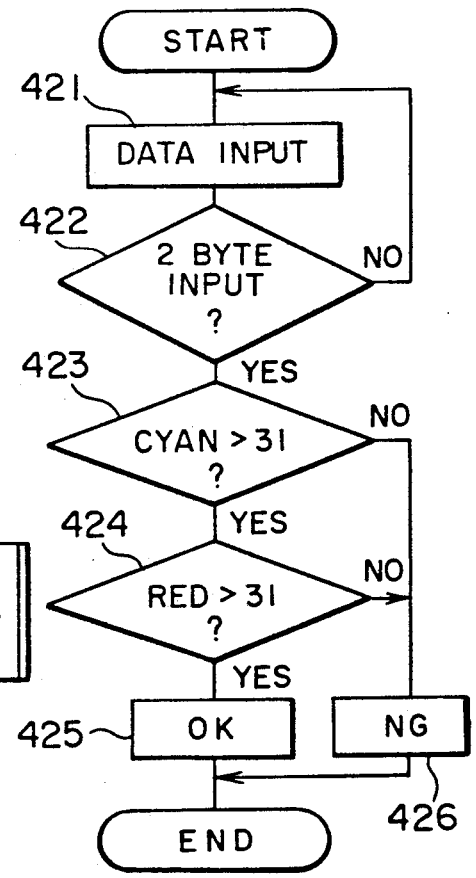
FIG. 12 is a flow chart which shows an example of the processing procedure in CPU for a scanner.

According to the transmitting data TxD, the scanner CPU 250 conducts the judgment processing 420 as shown in FIG. 12.

At first, the transmitting data TxD is input. Then the data is checked to see whether it is 2 bytes or not. (step 421, 422) When 2 bytes transmitting data are input, the density levels of red and cyan from the data are compared with standard density levels. (step 423, 424)

All standard density levels are set at the middle of the maximum density level. When the maximum density level is 63, the standard level should be set around 31.

If all of the density levels are higher than the standard ones, the CCD and the light source are assumed to be right and the process proceeds to the next copy. (step 425) When any of the density levels is under the standard levels, it is judged that the CCD is faulty or the adjustment is incorrect, and the processing to take corrective measures is conducted. (step 426) This processing prohibits copying or warns that there is a problem, by a flashing warning lamp for example.

When the density level of red and that of cyan are both lower than the standard levels, it is judged that the source of light needs to be replaced because the intensity of the light source is decreased or the light source is broken. In this case, a display indicates the problem. This judgment and processing are conducted in Step 426.

According to the first example, the condition of the components is judged by the density level of a plurality of digital color signals supplied to the color-discriminating means.

A plurality of digital color signals are defined as signals obtained by sensing the reflected light by a photoelectric converting means such as a CCD and the like, in this case the reflected light is the light reflected on the standard white board being emitted from the light source. Then the analogue signals are converted into digital signals, and the output signal is obtained after the A/D conversion. Therefore, this example of the invention possesses the following features. According to the invention, the condition of the CCD, inadequate intensity of the light source, and breakdown of the light source are easily and positively judged.

According to the second example of the present invention, light distribution of the light source is judged from the digital color signals obtained when the standard document, in this example the standard white board, is scanned.

Therefore, the digital color signals obtained from the prescribed area are latched by the latch circuit 200, and taken in by CPU 160 for image processing. Center pulse CSP is used as a latch pulse. Center pulse CSP will be explained later.

The digital color signals taken in to CPU 160 are further taken in to CPU (scanner CPU) 250 which controls the optical system (scanner) and the distribution of light is displayed.

A request signal REQ which is used in the light distribution confirmation mode, is a signal to control transmitting and receiving of serial data between the scanner CPU 250 and the image processing CPU 160. This is synchronized by the serial clock signal SCK.

In the second example, when the apparatus is in the adjusting mode in which maintenance or inspection is conducted, the condition of light distribution is checked at the same time.

In the light distribution adjusting mode, as shown at E, F, and G in FIG. 10, the information on the standard white board is scanned when the light source 370 is turned on and the optical system of the scanner is at the home position.

The receiving data RXD is transmitted to the image processing CPU 160 according to the instructions of the request signal REQ. (Refer to E and F in FIG. 10.)

In CPU 160, judgment processing is conducted at each sampling position according to the receiving data RxD. The judgment results in 2 bytes data which become the transmitting data TxD. This judgment is conducted for each color signal.

The judgment results are transmitted to the scanner CPU 250 together with the transmitting data TxD for each color signal and the results are displayed. (Refer to G in FIG. 10)

Display is conducted at each sampling position for each color signal. (Refer to FIG. 13.) LED can be used as the display element, and the display can be conducted as follows. When the signal level is low, LED is turned off. When the level is normal, LED is turned on. When the level overflows the standard, LED turns on and off.

In the light distribution confirmation mode, the signal obtained by scanning for one line of CCD, is converted to a digital signal and the density level of the signal is judged for each color. In this second example, a plurality of sampling positions are set in the direction of the light source so that the density level of each color can be confirmed over almost all the area of the light source.

Assuming that the effective area of a line portion of LED in the direction of the light source, is divided into 7, that data is extracted from each divided area, and that the effective area is composed of 5000 bits, the position of the pixel to be latched, in other words the sampling position, is moved by changing the center pulse CSP (CSP1 to CSP7) line by line in order as shown in FIG. 14.

Accordingly, when the first sampling position is the 480th pixel of CCD, the second one is the 1152nd pixel and the last one is the 4592nd pixel.

The light distribution adjusting mode is shown as Mode II. Mode II is composed of 2 channels. The first channel is the light distribution confirming mode pertaining to cyan and the next channel is the mode pertaining to red.

The data PxA and PxB among the transmitting data TxD shown in FIG. 8, is the 2 byte transmitting data which shows the results of density level judgment in the light distribution adjustment confirming mode I.

In this explanation, 'x' shows the sampling position in the direction of horizontal scanning. in this example, there are 7 positions. The same bit at the same sampling position shows the results of judgment at the position.

The relation between the condition of level judgment, the results of level judgment, and the transmitting data PxA and PxB which shows the results of judgment, is shown in FIG. 15. For example, when the result of judgment at the sampling position 'x' is normal, the transmitting data TxD is composed by coding, such as PxA =1 and PxB =0.

Figure 16:
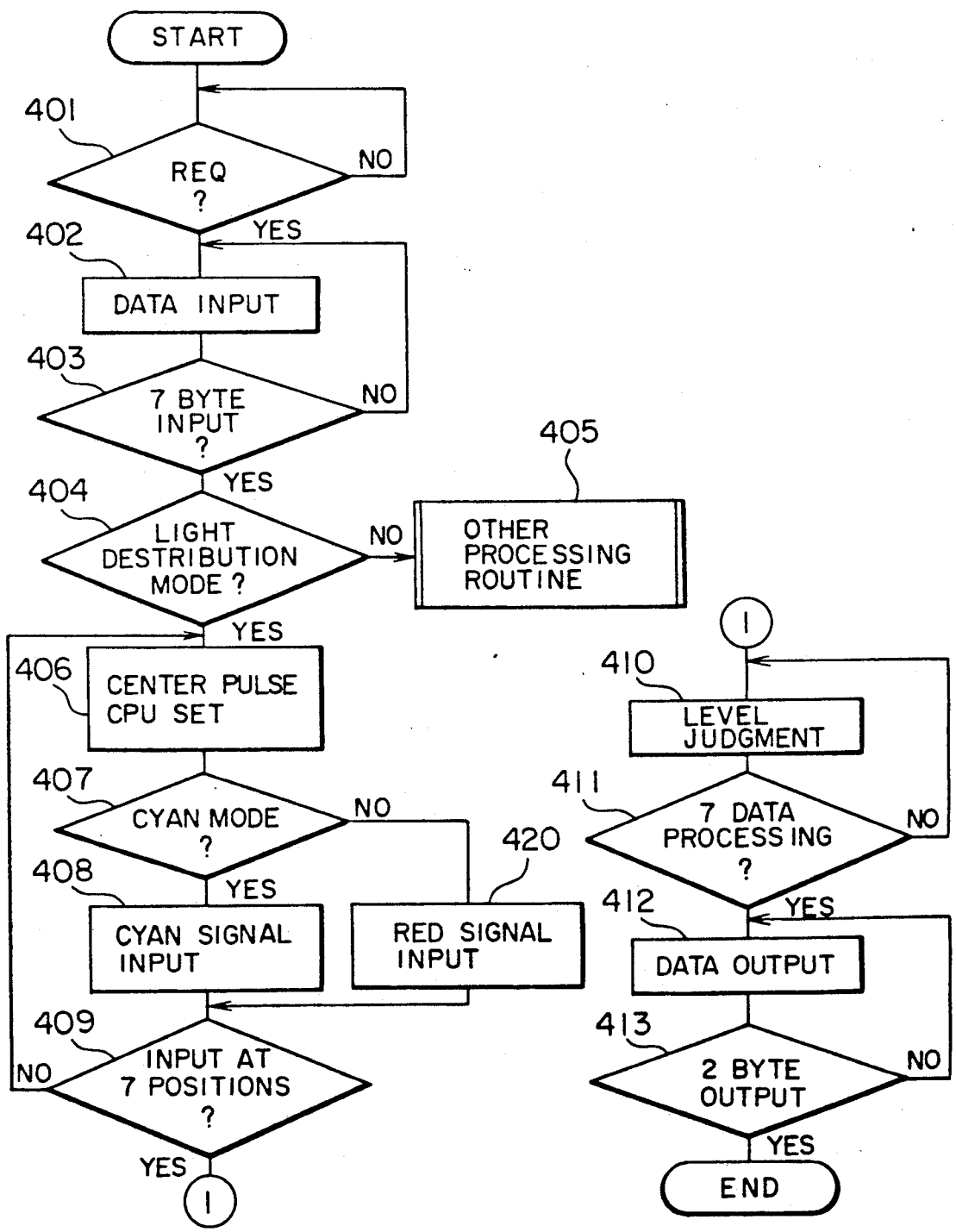
FIG. 16 is a flow chart which shows an example of processing procedure in image processing CPU.

FIG. 16 is a flow chart 400 which shows an example of the control program for confirming light distribution adjustment.

When it is detected that the request signal REQ has become active, input of the receiving data RxD starts. When all the data (7 bytes) has been input, the receiving data RxD which is in the first bite, is decoded. (step 401 to 404)

When, after decoding, the mode is found not to be the transmitting mode II, the data processing is changed to another processing routine 405. When the mode is the transmitting mode II, the center pulse CSP1 is inputted to the CPU. (step 406) Then, the color signals which were designated by the check data CHKIPO to CHKIPZ, are checked. (step 407) Since cyan is first, the digital color signal related to cyan is input first. After that, the sampling position of the center pulse CSP is changed and the same data processing is conducted. After the data input of all sampling positions is finished, judgment of the inputting level is conducted. (step 408 to 410) The number of this judgment is the same as that of sampling. (step 411)

When all judgment processing has been finished, the results of the judgments are coded and the coded data is transmitted as the transmitting data TxD. (step 412) When this transmitting data TxD becomes 2 bytes, the transmitting mode finishes.

The same processing is conducted with regard to the red digital color signal. (step 420)

According to the second example explained above, the features of the present invention are as follows. In the adjustment mode, the judgment of the density level is carried out according to the digital color signal obtained just before color-discrimination is conducted, and the sampling position in a line, of the digital color signal used in the judgment, is adjustable.

According to the invention, light distribution of the light source can be detected without using an oscilloscope or other equipment. Since light distribution can be detected along almost all of a line, the deteriorating condition of the light source can be accurately known, which is a practical advantage of the invention. Therefore, an operator can precisely judge from the data whether light distribution should be adjusted or not.

Referring to FIG. 17 and others, the third example will be explained in detail in which a color image processing apparatus of the present invention is applied to the above-mentioned color copier.

FIG. 17 is a schematic illustration of the color image processing apparatus. In the drawing, the units and parts which have the same function as those shown in FIG. 1. have the same numerals. The same explanation as that of FIG. 1 is omitted.

The difference between FIG. I and FIG. 17 is that the level adjusting circuits 8 and 9 are installed in FIG. 17. Image signals R and Cy are adjusted in the level adjusting circuits 8 and 9. The object of density level adjustment is to eliminate overflow in A/D conversion and improve efficiency of the conversion. Density level adjustment is conducted so that the level of image signals obtained from the maximum luminance position of the light source becomes the standard level. The details will be explained later.

After the density level is adjusted, the image signal is supplied to A/D converters 10 and 11, and converted to the prescribed bit number, in this example, a 6 bit digital signal.

In this example, according to the digital color signal which is input to the color-discriminating circuit 20, in other words the digital color signal obtained by reading out the standard white board, the image signal level which is input to A/D converters 10 and 11 is adjusted in advance.

For that reason, the digital color signal obtained from the prescribed area, is latched in the latch circuit 200 and inputted into the image processing CPU 160. The center pulse CSP which will be described later, is used as the latch pulse.

The digital color signal inputted into CPU 160 is furthermore inputted into CPU (scanner CPU) 250 which controls the optical scanning system scanner) and the level of the level adjusting circuits 8 and 9 is adjusted according to the image signal corresponding to the specific sampling position. At the same moment, the maximum level position of the light source is displayed.

In the third example, when the apparatus is in the maintenance and inspection mode, the level adjusting circuits 8 and 9 are adjusted.

In this adjusting mode, Judgment is conducted in the same way as in example 2.

The results of the judgment are inputted to the scanner CPU 250 for each color signal being transmitted as the transmitting data TxD. (Refer to G in FIG. 10.) The level adjusting circuits 8 and 9 are controlled by this data transmission so that the peak value coincides with the standard level (the sampling level close to the maximum). The peak value position of the light source is displayed. (FIG. 13)

A plurality of sampling positions are set in the same way as in the second example.

The level adjusting mode is shown as Mode III. Mode III is composed of 2 channels. The first channel is the level adjusting mode relating to cyan and the next one is the level adjusting mode relating to red.

The pixel position at the peak value is defined as '1, 1' for instance. The pixel positions at the level lower than this are all '0, 0'.

The control program to detect the peak value is carried out in the same way as the control program to confirm light distribution adjustment shown in FIG. 16.

In the pre-scanning mode, when it is detected that the request signal REQ becomes active, image processing CPU starts inputting the receiving data RxD. When all the input data (7 bites) is inputted, the receiving data RxD which was inputted in the first bite, is decoded. (step 401 to 404)

When the results of decoding show that the mode is not the transmitting mode III, the apparatus changes to another processing routine 405. When the mode is the transmitting mode III, the center pulse CSP 1 is inputted to the CPU. (step 406) The designated color signal is discriminated by the check data CHKIP0 to CHKIPZ. (step 407) The first one is cyan, so the digital color signal relating to cyan is inputted at first. Thereafter, the sampling position of the center pulse CSP is changed and the same processing is conducted. (step 408)

In the level adjusting circuits 8 and 9 mentioned above, the apparatus is controlled so that the output at the sampling position, where the peak value appears, becomes the standard level. By controlling in this way, the peak value in one scanning line is lower than the standard level. Therefore, overflow does not occur in A/D conversion.

According to the third example of the invention, light distribution of the light source is detected and the level is adjusted on the basis of the output level of the sampling position where the peak value is obtained.

By adjusting in this way, the peak value becomes lower than the standard value. Therefore, the problem that image signals can not be A/D converted correctly because of overflow during A/D conversion, can be solved. Accordingly, even when light distribution is biased to the peripheral area rather than the central area, A/D conversion accuracy can be improved.

It can be said from the explanation that the present invention is particularly well fitted for a color image processing apparatus such as the color copier mentioned above.

What is claimed is:

1. An apparatus for processing an image, comprising:
   a scanning means for producing a plurality of electrical image signals representing an image having a standard density;
   means for converting said plurality of electrical image signals to a plurality of digital image signals; and
   means for determining whether the scanning means is functioning properly by comparing a density level of at least one of said plurality of digital image signals to a predetermined value.

2. The apparatus of claim 1, wherein said scanning means includes means for irradiating said image with light.

3. The apparatus of claim 2, further comprising means for separating light reflected from said irradiated image into a plurality of elemental color lights.

4. The apparatus of claim 3, wherein said scanning means further includes means for converting said plurality of elemental color lights into said plurality of electrical image signals.

5. The apparatus of claim 1, wherein said scanning means includes means for converting a plurality of elemental color lights representing said image into said plurality of electrical image signals.

6. The apparatus of claim 1, further comprising means for displaying the determination made by said determining means.

7. The apparatus of claim 1, wherein said apparatus is for use with a copy machine, said apparatus stopping a copying operation of said copy machine when said determining means determines that said scanning means is not functioning properly.

8. An apparatus for processing an image, comprising:
   means for producing a light representing an image;
   first conversion means for converting said light into electrical image signals, said first conversion means including at least one photoelectric device;
   second conversion means for converting said electrical image signals to digital image signals;
   means for measuring density levels of digital image signals converted from corresponding electrical image signals produced by a plurality of corresponding sampling positions located along said at least one photoelectric device;
   means for displaying whether said density levels are low, normal, or high.

9. The apparatus of claim 8, wherein said light producing means includes means for irradiating an image with light and means for separating light reflected from said irradiated image into a plurality of elemental color lights, said plurality of elemental color lights representing the image.

10. The apparatus of claim 8, further comprising means for designating a sampling position, to produce an electrical image signal, from said plurality of sampling positions.

* * * * *